Nov. 11, 1924.　　　　　　　　　　　　　　　1,515,352
G. D. MANTLE
RECUPERATOR
Filed June 26, 1923

INVENTOR
Gregory D. Mantle
By Byrnes, Stebbins & Parmelee
His Attys

Patented Nov. 11, 1924.

1,515,352

UNITED STATES PATENT OFFICE.

GREGORY D. MANTLE, OF PITTSBURGH, PENNSYLVANIA, ASSIGNOR TO THE COLORIZING COMPANY, OF PITTSBURGH, PENNSYLVANIA, A CORPORATION OF DELAWARE.

RECUPERATOR.

Application filed June 26, 1923. Serial No. 647,883.

*To all whom it may concern:*

Be it known that I, GREGORY D. MANTLE, a subject of the King of England, residing at Pittsburgh, in the county of Allegheny and State of Pennsylvania, have invented a new and useful Improvement in Recuperators, of which the following is a full, clear, and exact description.

My invention relates to recuperators, and is particularly valuable in connection with recuperators employing metallic tubes or passages, although it may also be applied to other constructions, as, for example, recuperators made of tile.

I provide a recuperator having manifolds so connected to the various recuperator tubes as to insure an equal flow of gas through all the tubes. The outlet manifold is preferably so formed that it provides a mutual aspirator action and insures an equal flow of gas or air through all of the tubes. The manifolds are preferably in the recuperator chamber, since this reduces the number of openings in the chamber walls. An expansion joint may also be provided in the chamber wall, particularly if metallic tubes are employed. The tubes are preferably symmetrically arranged around a central axis substantially coincident with the axes of the inlet and outlet tubes.

In the accompanying drawings illustrating the present preferred embodiment of my invention,—

Figure 1:
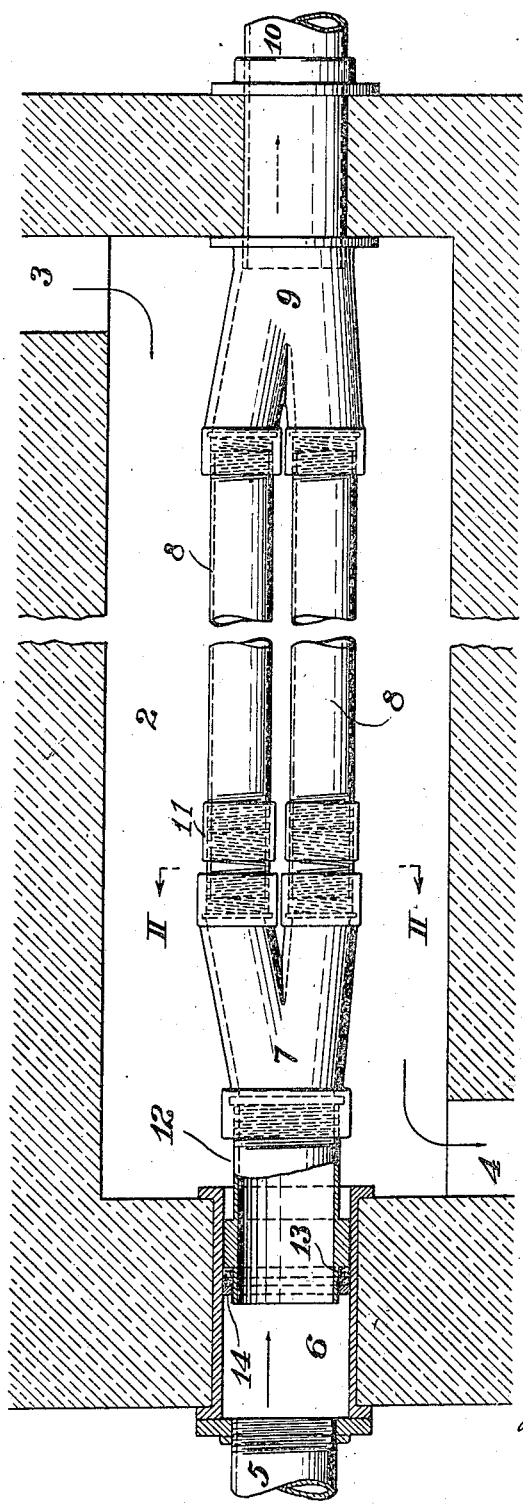
Figure 2:
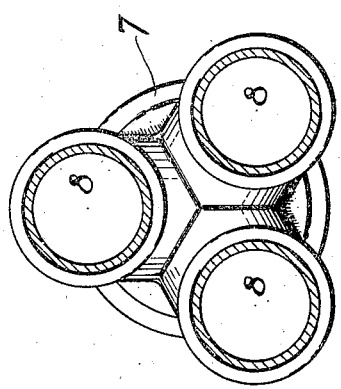

Figure 1 is a cross sectional view through a recuperator embodying my invention; and Figure 2 is a section on the line II—II of Figure 1.

In the illustrated embodiment of my invention a chamber 2 of any desired construction is provided with an inlet 3 at one end for hot gases and an outlet 4 at the other end for the gases after they have given up their heat. The air or other fluid to be heated is introduced from a passage 5 through an opening 6 in one wall of the chamber 2, and thence through a manifold 7 to the recuperator tubes 8. These tubes may be of any desired dimensions as required by the heat exchange capacity of the apparatus, but preferably comprise at least two sections, as shown in Figure 1.

The recuperator tubes 8 terminate in a header 9 from which they leave the apparatus through a passage 10 in the wall of the chamber 2. It will be noted that the header or manifold 9 is in effect an aspirator, so that if the flow through any one of the recuperator tubes 8 should decrease, the gas flow through the others will induce a greater flow through the lagging tube, thus tending toward uniform air flow, uniform heating, and maximum efficiency.

As shown in Figure 1, the recuperator tubes 8 make a screw connection with the headers 7 and 9. As mentioned above, the tubes 8 each comprise at least two portions, and these portions are connected by a coupling 11. The coupling 11 is provided with right and left-hand threads to make assembly possible. The two sections may be of any desired length. The provision of the threaded coupling 11 insures that all of the joints will be tight at all times.

An expansion joint is provided in the opening 6. This joint consists of a short nipple 12 threaded into the manifold 7 and extending into the opening 6. Packing rings 13 of asbestos or the like and a threaded chaser ring 14 are provided to insure a tight joint.

It will be understood that while I have shown a metallic tube recuperator of the counter-flow type with the hot gases on the outside of the tubes, the conditions may be reversed if desired and other forms of tubes may be employed. I provide a recuperator of simple and inexpensive construction and in which any danger of leakage is minimized since the screwed joints and the provision of a single passage through the chamber walls offer the least possible opportunity for the gases to escape. The provision of the expansion joint, which is preferably at the cooler end of the chamber, prevents buckling or other deterioration of the recuperator structure.

The aspirator action of the tubes is highly desirable, and the manifolds in effect are a continuation of the recuperator tubes in which the tubes converge to a common axis. The passages 5 and 10 are preferably coaxial, and the tubes 8, of which there may be any desired number, are preferably symmetrically arranged and at an equal distance from the axis of the tubes 5 and 10, since this materially improves the aspirator effect.

While I have shown a preferred embodiment of my invention, it will be understood that it is not limited thereto but may be otherwise embodied within the scope of the following claims.

I claim:

1. In a recuperator, a plurality of recuperator tubes converging into a common outlet whereby a mutual aspirator action is set up, substantially as described.

2. In a recuperator, a plurality of recuperator tubes equally spaced from a central axis and converging into a common outlet, substantially coaxial with the central axis whereby a mutual aspirator action is set up, substantially as described.

3. In a recuperator, a plurality of equal and uniform recuperator tubes symmetrically disposed about a central axis and converging into a common outlet substantially coaxial with the central axis, substantially as described.

4. A recuperator including a chamber having a fluid inlet and an outlet, two substantially coaxial passages through the chamber walls at opposite ends of the chamber, manifolds connected thereto within the chamber, a plurality of recuperator tubes connecting the manifolds, and an expansion joint in one of the passages, substantially as described.

5. A recuperator including a chamber, coaxial passages at opposite ends thereof, a branch piece at each end for dividing the passages into a plurality of passages, and tubes connecting such passages, each of the tubes being in at least two parts and connected to each other by a screw coupling having a right and left-hand thread, substantially as described.

6. In a recuperator, a plurality of recuperator tubes, and means for exerting a substantially uniform aspirating action on each of said tubes, substantially as described.

7. In a recuperator, an inlet tube branching into a plurality of recuperator tubes symmetrically arranged about an axis substantially coincident with the axis of the inlet tubes, the recuperator tubes converging into a common outlet substantially coaxial with the central axis, substantially as described.

8. In a recuperator, a common inlet and a plurality of recuperator tubes symmetrically disposed about it, substantially as described.

9. In a recuperator, a common outlet and a plurality of recuperator tubes symmetrically disposed about it, substantially as described.

10. In a recuperator, a common inlet and a common outlet, and a plurality of recuperator tubes symmetrically disposed about them, substantially as described.

In testimony whereof I have hereunto set my hand.

GREGORY D. MANTLE.